(12) United States Patent
Ching

(10) Patent No.: US 11,052,818 B2
(45) Date of Patent: Jul. 6, 2021

(54) LARGE VEHICLE TURNING SAFETY WARNING APPARATUS

(71) Applicant: Ya-Chi Ching, Yilan County (TW)

(72) Inventor: Ya-Chi Ching, Yilan County (TW)

( * ) Notice: Subject to any disclaimer, the term of this patent is extended or adjusted under 35 U.S.C. 154(b) by 30 days.

(21) Appl. No.: 16/419,750

(22) Filed: May 22, 2019

(65) Prior Publication Data

US 2020/0369202 A1 Nov. 26, 2020

(51) Int. Cl.
*B60Q 1/32* (2006.01)
*B60Q 1/34* (2006.01)

(52) U.S. Cl.
CPC ............... *B60Q 1/32* (2013.01); *B60Q 1/346* (2013.01); *B60Q 2400/50* (2013.01)

(58) Field of Classification Search
CPC ....... B60Q 1/32; B60Q 1/346; B60Q 2400/50
See application file for complete search history.

(56) References Cited

U.S. PATENT DOCUMENTS

| 2003/0151504 | A1* | 8/2003 | Chang | B60Q 1/302 340/468 |
| 2013/0169425 | A1* | 7/2013 | Victor | G08G 1/162 340/435 |
| 2014/0313756 | A1* | 10/2014 | Thomson | B60Q 1/484 362/514 |
| 2016/0137124 | A1* | 5/2016 | Lee | G01S 17/931 340/435 |

* cited by examiner

*Primary Examiner* — Qutbuddin Ghulamali
(74) *Attorney, Agent, or Firm* — Chun-Ming Shih; HDLS IPR Services

(57) ABSTRACT

The invention provides a large vehicle turning safety warning apparatus, which is mainly through a warning device set on at least one turning warning zone of a car body, and a control signal is generated by a control module to control the starting or closing of the warning device, or to control the warning device to execute a warning mode. In this way, when vehicles or pedestrians approach the car body, the warning device can be known by the warning device, so as to evade the invisible zone of the car body. Thus, the safety of driving is increased to avoid the occurrence of related traffic accidents because the driver of the car body cannot know whether there are pedestrians or related vehicles in the invisible zone.

11 Claims, 10 Drawing Sheets

LARGE VEHICLE TURNING SAFETY WARNING APPARATUS

FIELD OF THE INVENTION

The invention relates to a large vehicle turning safety warning apparatus, and more particularly to a large vehicle turning safety warning apparatus set with a warning device on at least one turning warning zone of a car body to warn the vehicles or pedestrians to evade their invisible zone.

BACKGROUND OF THE INVENTION

With the vigorous development of the vehicle industry, the use of vehicles has become one of the indispensable tools in people's daily life. However, although vehicles can bring convenience to people's traffic, it is relatively easy to cause traffic accidents due to inadvertent driving or other factors.

When driving a large vehicle, even if the driver can assist in viewing different driving visions through a variety of mirrors (such as rearview mirror or side-view mirror), because the large vehicle occupies a large space, there will always be zones that the driver cannot see, and these zones are usually called invisible zones. Thus, when a vehicle (e.g. a motorcycle) approaches the large vehicle, if the motorcycle is situated right in the invisible zone of the large vehicle, it may be because the driver is unaware that there is a motorcycle in the invisible zone, and the motorcyclist cannot be warned that the driver is not aware of the invisible zone, thus causing related traffic accidents.

In order to provide early warning for motorcyclists to the invisible zone of large vehicles, some inventions have been invented to make large vehicles illuminate the invisible zone and thus achieve the warning function.

For example, if a prior technology (hereinafter referred to as the first prior technology) can use a steering wheel to synchronize with a control device, when the driver uses the steering wheel to make left or right turns, the steering wheel angle sensor will capture the steering wheel turning action, so as to drive the control device to control the laser to illuminate a zone formed by the difference of radius between inner wheels in the corresponding direction, and then remind others of the dangerous zones caused by turning large vehicles.

However, the first prior technology must wait until the large vehicle has turned (after the steering wheel turns) before it can illuminate the zone formed by the difference of radius between inner wheels. Thus, if pedestrians or motorcyclists are already in the zone formed by the difference of radius between inner wheels of the large vehicle, even if the large vehicle after turning will illuminate the zone formed by the difference of radius between inner wheels, traffic accidents may still occur because pedestrians or motorcyclists cannot evade them in time. Further, in order to avoid the steering wheel being too sensitive to mislead the driver to trigger the warning alarm device when changing the runway, a fuzzy control is usually installed in the first prior technology to prevent large vehicles from triggering the warning alarm device to illuminate the zone formed by the difference of radius between inner wheels due to vehicle jitter or small angle steering caused by changing the runway. However, the first prior technology cannot effectively achieve the early warning effect because such a design will delay the warning of pedestrians or motorcyclists even more.

Moreover, when the driver is parking, the steering wheel must be rotated substantially in order to effectively park, which will cause the warning device to be triggered continuously while parking. This will not only cause unnecessary waste of power, but also easily cause trouble to others.

For further example, another prior technology (hereinafter referred to as the second prior technology) can use a detection module to detect the steering parameter (the number of turns of the steering wheel) of the vehicle, then use a control module to calculate an area formed by the difference of radius between inner wheels based on the steering parameter and a built-in steering characteristic parameter, and then use a projection module to project the area formed by the difference of radius between inner wheels based on the calculated area formed by the difference of radius between inner wheels to achieve the function of early warning.

However, the range of the zone formed by the difference of radius between inner wheels of the large vehicle may vary depending on the size of the wheelbase, the car body, the speed and the turning angle. Therefore, the second prior technology only considers the steering parameter to calculate the zone formed by the difference of radius between inner wheels, which resulted in the inaccuracy of the calculated zone area.

Further, since the second prior technology will not perform the relevant calculation and projection until the vehicle is turned. As such, the second prior technology is similar to the first prior technology, which cannot effectively provide early warning for pedestrians or motorcyclists.

Moreover, the second prior technology needs to carry out relevant operations in each turn to calculate the area formed by the difference of radius between inner wheels, and must constantly change the illumination angle of the projection module in order to effectively project the calculated area formed by the difference of radius between inner wheels. In order to achieve the technical means to improve the above problems, it is necessary to install an additional computing element, as well as relevant pivoting devices or optical masks on the projection module. In this way, the cost of achieving the second prior technology will be greatly increased, and the function of early warning still cannot be effectively achieved.

In view of this, a simple and effective technology is urgently needed in this field to warn large vehicles of the invisible zone (the zone formed by the difference of radius between inner wheels) to improve the above problems.

SUMMARY OF THE INVENTION

To solve the aforementioned problems, the object of the present invention is to provide a large vehicle turning safety warning apparatus, which is mainly through a warning device set on at least one turning warning zone of a car body, and the warning device has an inclination angle so as to present an illumination angle between the car body and a warning light emitted from the warning device, thereby avoiding the warning light directly illuminating the line of sight range of the motorcyclist or vehicle, and then a control signal is generated by a control module to control the starting or closing of the warning device, or to control the warning device to execute a warning mode. In this way, when vehicles, motorcyclists or pedestrians approach the car body, the invisible zone of the car body can be known by the warning device, so as to evade the invisible zone, thereby increasing the driving safety and improving the high-cost shortcomings. By synchronizing the warning device with a direction light to start or close the warning device through the direction light, or by starting or closing the warning device through a control module or a remote control device to provide warning or 24-hour sunshine warning. Therefore, the invention can effectively improve the deficiency of the existing technology in the early warning function.

To achieve the above object, the invention provides a large vehicle turning safety warning apparatus, which comprises:

a car body, a periphery of the car body is set at least one turning warning zone, and a bottom of the car body is set with plural tires, wherein the at least one turning warning zone is set on an adjacent periphery of any one of the plural tires;

at least one warning device, the at least one warning device is set on the at least one turning warning zone, each of the at least one warning device provides a warning light; and a control module, the control module receives a control instruction to generate a control signal, the control module is connected with the at least one warning device to transmit the control signal to the at least one warning device, wherein the control module starts or closes the at least one warning device based on the control signal.

Preferably, the warning device is synchronized with a direction light of the car body. When the control module starts or closes the direction light, the control module simultaneously generates the control signal to start or close the at least one warning device based on the control signal.

Preferably, the control module is connected with a direction light control element, when the direction light control element sends a control instruction, the control module generates a direction light signal and the control signal, the control module transmits the direction light signal to the direction light to control the starting or closing of the direction light, and the control module simultaneously transmits the control signal to the at least one warning device to start or close the at least one warning device based on the control signal.

Preferably, the at least one warning device further executes a warning mode based on the control signal.

Preferably, the warning mode includes at least one or any combination of scintillation mode, breathing mode, flowing mode, gradient mode and constant brightness mode.

Preferably, the control module is set on a display device, wherein the display device generates the control instruction for transmission to the control module.

Preferably, the display device includes one of the automotive control screens or intelligent mobile electronic devices.

Preferably, each of the at least one warning device is provided with an inclination angle so that any illumination angle between the warning light and the car body is between 35 and 80 degrees.

Preferably, the warning light provided by each of the at least one warning device is a line-type light.

Preferably, the connection between the at least one warning device and the car body is made by using any connection mold such as clamping, sticking, welding or locking.

Preferably, each of the at least one turning warning zone is set at a position between 0.3 and 1.4 meters in height.

Preferably, each of the at least one warning device includes one of the daytime running light, LED light, laser light or halogen lamp.

Preferably, the car body includes one of the large passenger vehicle, bus, truck, dump truck, tour bus, tractor-full trailer, tractor-semi trailer or goods vehicle.

DETAILED DESCRIPTION OF THE PREFERRED EMBODIMENT

Figure 1:
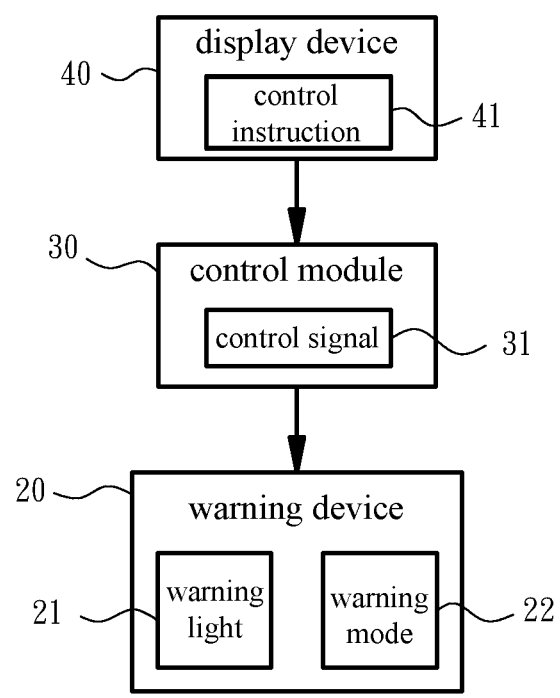
FIG. 1 is a system connection diagram of the present invention.

In order to make the object, technical scheme and advantages of the present invention clearer and easier to understand, the invention is further illustrated in detail below in connection with the drawings and embodiments. It should be understood that the specific embodiments described herein are used only to explain the invention, but not to limit the invention.

Referring to FIGS. 1 to 10, the invention discloses a large vehicle turning safety warning apparatus, in which the above-mentioned large vehicle refers to a large passenger vehicle, a bus, a truck, a dump truck, a tour bus, a tractor-full trailer, a tractor-semi trailer, a goods vehicle or other vehicles with a total weight of more than 3500 kilograms. When this kind of vehicle is driving, it is easy to cause many invisible zones which cannot be seen in driving because the car body is too large.

The present invention comprises a car body 10 (such as the large vehicle mentioned above), a warning device 20 and a control module 30. A periphery of the car body 10 is set with at least one turning warning zone 11 and a bottom of the car body 10 is set with plural tires 12 to assist the car body 10 to move. However, the specific setting position of the at least one turning warning zone 11 is on a frame of the car body 10 adjacent periphery to any one of the plural tires 12, and is arranged on the car body 10 in a transverse encircling manner, while the setting height of the at least one turning warning zone 11 is between 0.3 and 1.4 meters, preferably between 0.6 and 1.2 meters.

The warning device 20 is set on the turning warning zone 11 to connect with the car body 10, in which the connection between the warning device 20 and the car body 10 is made by using any connection mold such as clamping, sticking, welding or locking. It only needs to connect the warning device 20 to the car body 10, which is not limited to any specific connection mode. When the warning device 20 is set on the turning warning zone 11, the warning device 20 is provided with an inclination angle so that any illumination angle θ between the car body 10 and a warning light 21 emitted by the warning device 20 is between 35 and 80 degrees to ensure that the warning light 21 is illuminated toward the ground, thereby avoiding the warning light 21 directly illuminating the line of sight range of a motorcyclist 50 or a vehicle.

When the warning device 20 provides the warning light 21, the warning light 21 is presented by a line-type light to delimit the boundary of the invisible zone. However, if plural warning devices 20 are set on the turning warning zone 11, the warning lights 21 provided by the warning devices 20 will also be connected to each other in a line, so that when the motorcyclist 50 or pedestrian sees the line presented by the warning lights 21, the region from the line to the car body 10 will be known as the invisible zone, so as to achieve the function of early warning. Further, if only the linear warning light 21 is provided, the power consumption needed to illuminate the entire area of the invisible zone can be effectively reduced and the same warning effect can be achieved.

For example, when the warning device 20 is set in parallel (approximately 90 degrees) with the car body 10, the warning light 21 provided by the warning device 20 will be directly illuminated to the line of sight range of the motorcyclist 50 or even it will directly illuminate into the eyes of the motorcyclist 50. In this way, it will prevent the motorcyclist 50 from checking the environmental conditions of the driving route normally and easily lead to traffic accidents. Therefore, when the warning device 20 is set on the turning warning zone 11, the warning light 21 will be illuminated toward the ground due to the inclination angle. However, the degree of the inclination angle will be adjusted according to the size and height of the car body 10, so that the warning light 21 with a suitable illumination angle $\theta$ can provide a warning to the motorcyclist 50 and avoid obstructing the line of sight of the motorcyclist 50.

Figure 2:
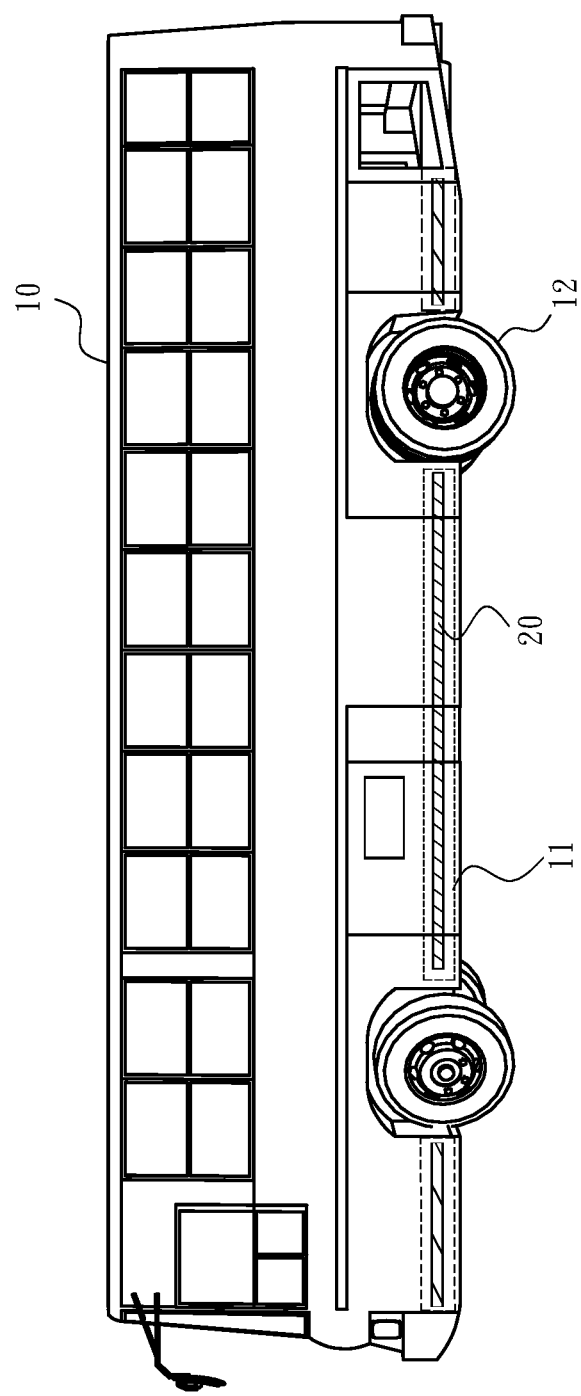
FIG. 2 is a schematic diagram of a setting position of a warning device on a large passenger vehicle according to a first embodiment of the present invention.
Figure 5:
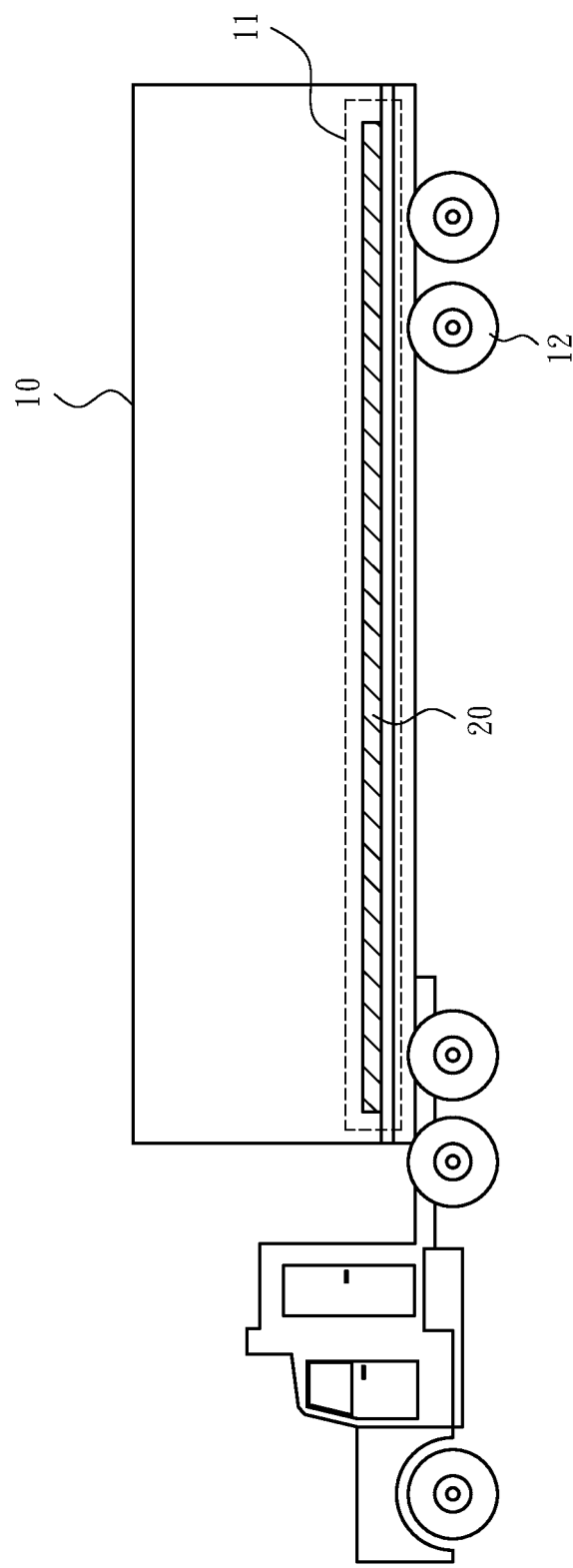
FIG. 5 is a schematic diagram of a setting position of a warning device on a tractor-semi trailer according to a second embodiment of the present invention.
Figure 8:
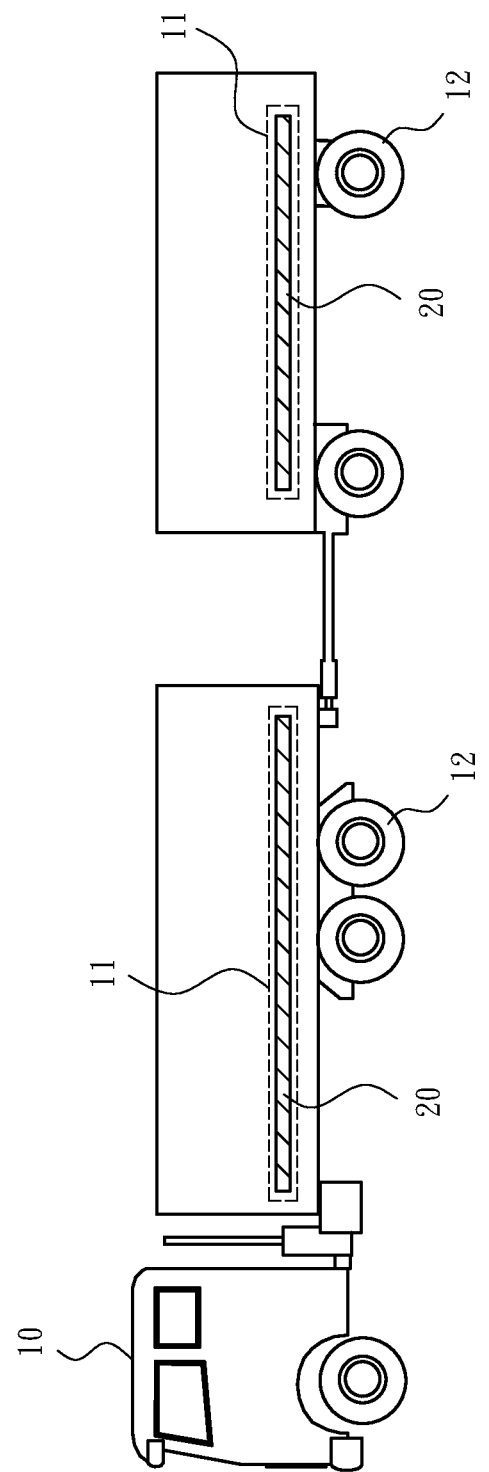
FIG. 8 is a schematic diagram of a setting position of a warning device on a tractor-full trailer according to a third embodiment of the present invention.

Further, because the warning device 20 is set at a height between 0.3 and 1.4 meters of the car body 10, and more specifically between 0.6 and 1.2 meters in height. The height of the setting position of the warning device 20 is mainly determined by the size of the plural tires 12 at the bottom of the car body 10. Generally speaking, the eye height of the motorcyclist 50 will be about 1.4 meters above when the motorcyclist 50 is driving. Thus, if the warning device 20 is set at a height above 1.4 meters, it will easily obstruct the line of sight of the motorcyclist 50 (as shown in FIGS. 2, 5 and 8).

Furthermore, the warning device 20 can be a daytime running light to provide 24-hour warning light (when the car body starts, the warning device is started to provide the warning light, or start or close the warning device through a remote control device), or any kind of LED light, laser light or halogen light can be used as the warning device 20 to provide the warning light 21.

In one embodiment, the control module 30 is set on a display device 40 and connected to the warning device 20. The display device 40 includes one of the automotive control screens or intelligent mobile electronic devices to generate a control instruction 41 through the display device 40. The control module 30 receives the control instruction 41 to generate a control signal 31 which is then transmitted to the warning device 20. In this way, the warning device 20 can start or close according to the control signal 31, or execute a warning mode 22 according to the control signal 31. The warning mode 22 includes at least one or any combination of scintillation mode, breathing mode, flowing mode, gradient mode and constant brightness mode, in which each of the above modes controls the warning device 20 to provide the warning light 21 in different illuminating modes to increase the attention of the motorcyclist 50.

In another embodiment, the direction light control element in the car body 10 is connected with the control module 30. When the driver toggles the direction light control element, the direction light control element generates a control instruction 41. For example, when the direction light control element is toggled up, the direction light control element generates a control instruction 41 to start the right-turn direction light. When the control module 30 receives the control instruction 41, besides generating a direction light signal for starting the right-turn direction light, it also simultaneously generates the control signal 31 for starting the warning device 20 set on the right side of the car body 10. Then the control module 30 transmits the direction light signal to the direction light to start the right-turn direction light, and transmits the control signal 31 to the warning device 20 to start the warning device 20 on the right side. In this way, the warning device 20 can operate synchronously with the direction light. When the direction light is started, the warning device 20 can be started simultaneously to provide the warning light 21. However, if the driver uses the direction light control element, a control instruction 41 for closing the direction light will be generated, and the control module 30 will also generate the direction light signal for closing the direction light and the control signal 31 for closing the warning device 20, thereby closing the direction light and the warning device 20. By synchronizing the warning device 20 with the direction light, the driver can warn the pedestrian or motorcyclist 50 of the invisible zone in advance before turning the large vehicle, so as to effectively achieve the early warning function.

Further, if both the display device 40 and the direction light control element can transmit the control instruction 41 to the control module 30 to control the starting or closing of the warning device 20, not only will there be no conflicting phenomena between them, but also they can be used as a complement to each other. For example, when the direction light control element fails to work, the driver can still transmit the control instruction 41 through the display device 40 to control the starting or closing of the warning device 20. Conversely, if the display device 40 fails to work, the control instruction 41 can be transmitted by the direction light control element to control the starting or closing of the warning device 20. Thus, in this embodiment, the present invention can also avoid that the warning light 21 cannot be provided in advance by the warning device 20 when a fault occurs, so as to achieve the function of early warning.

When the car body 10 turns, according to the difference of the car body 10, the difference of radius between inner wheels will be different; this will also lead to the change of the invisible zone of the car body 10. Therefore, the far and near illumination of the warning light 21 provided by the warning device 20 will be adjusted according to the difference of radius between inner wheels (the inclination angle or the setting height of the warning device 20 can be used for adjustment).

Figure 3:
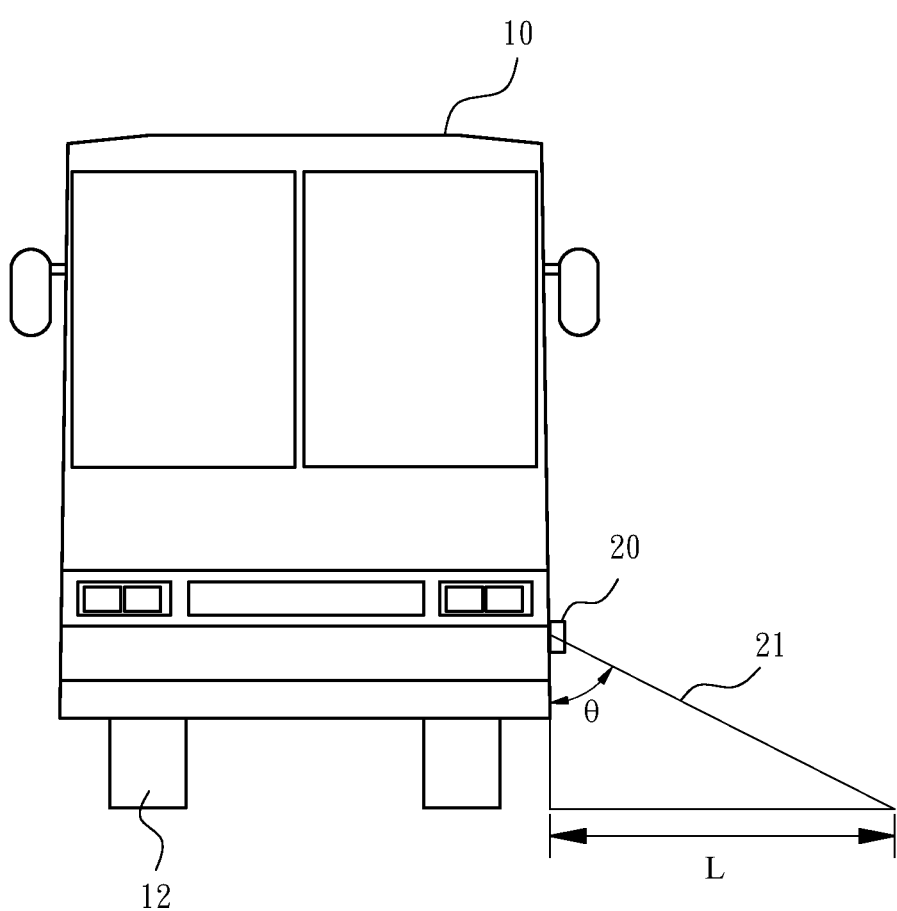
FIG. 3 is a schematic diagram of a front view of the large passenger vehicle according to the first embodiment of the present invention.
Figure 4:
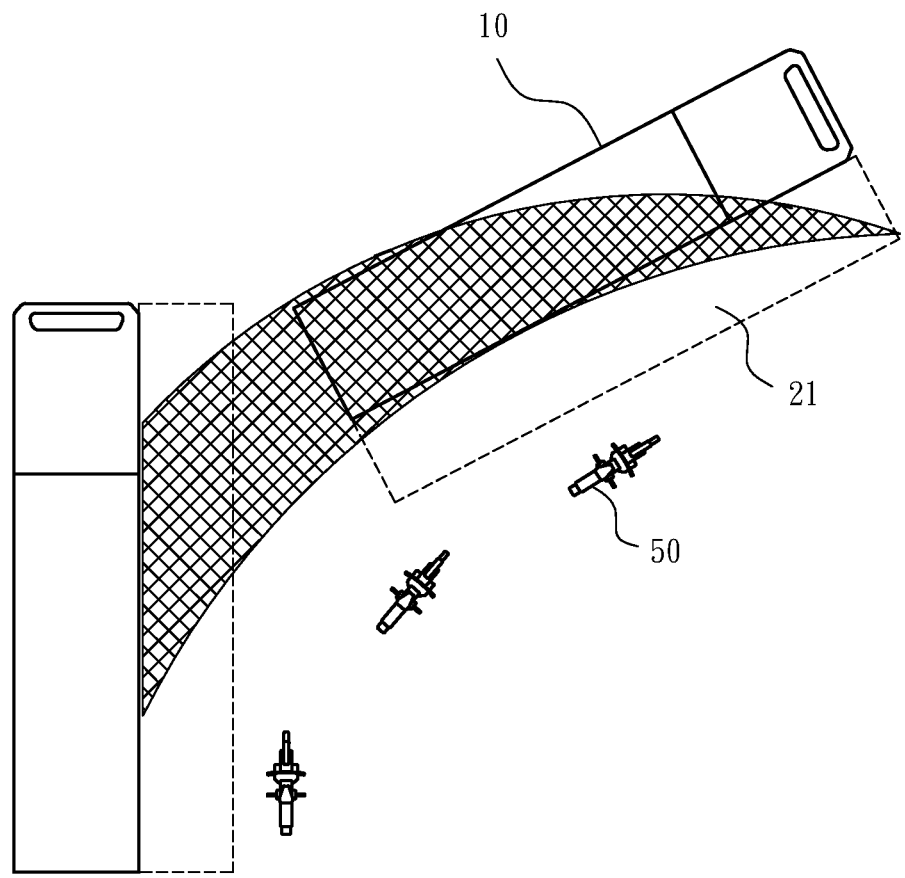
FIG. 4 is a schematic diagram of the large passenger vehicle turning according to the first embodiment of the present invention.
Figure 6:
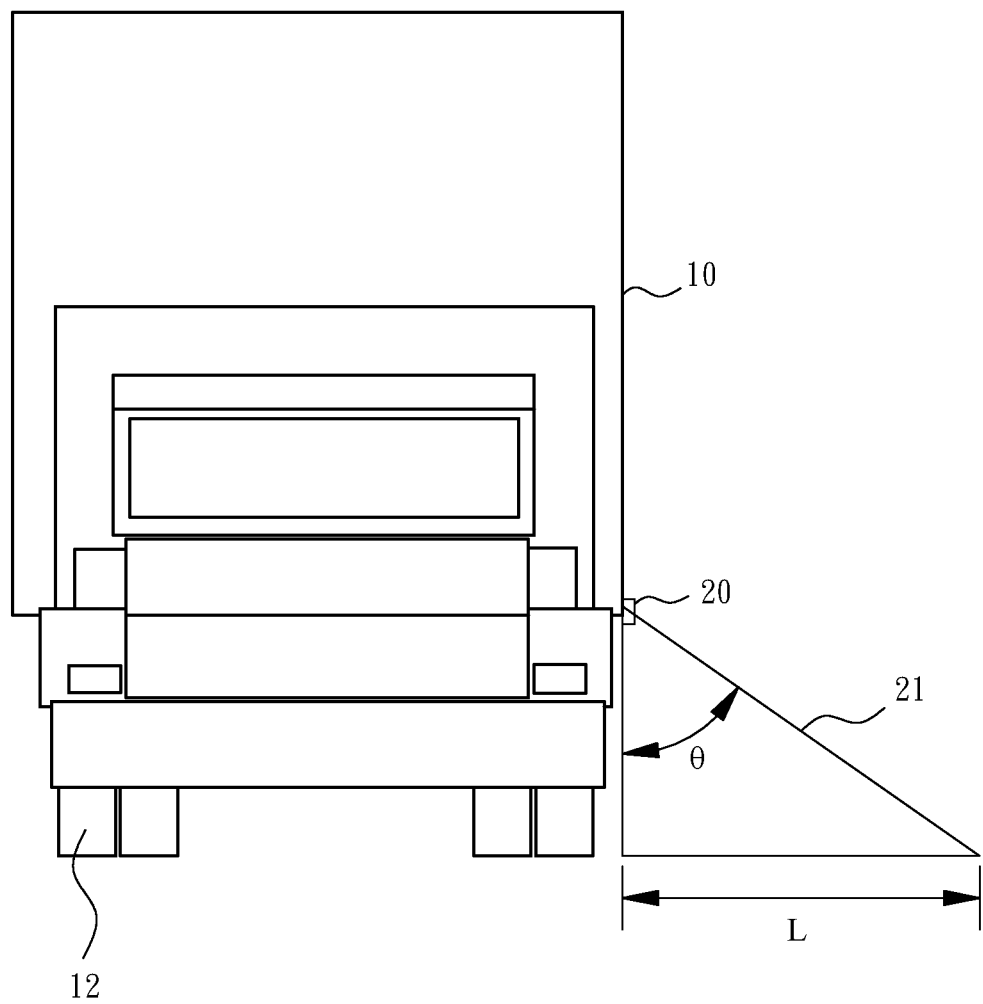
FIG. 6 is a schematic diagram of a front view of the tractor-semi trailer according to the second embodiment of the present invention.
Figure 7:
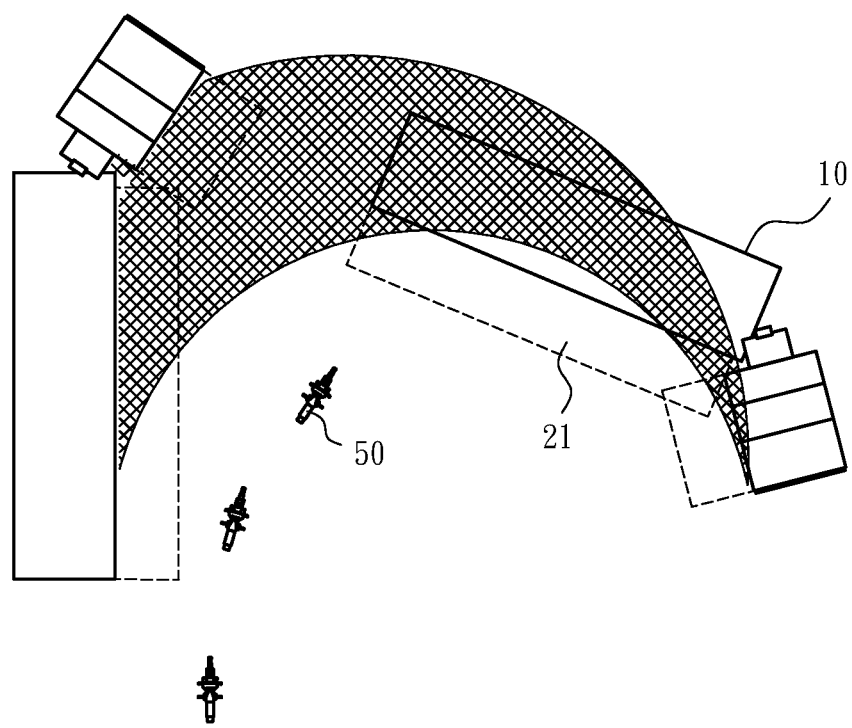
FIG. 7 is a schematic diagram of the tractor-semi trailer turning according to the second embodiment of the present invention.
Figure 9:
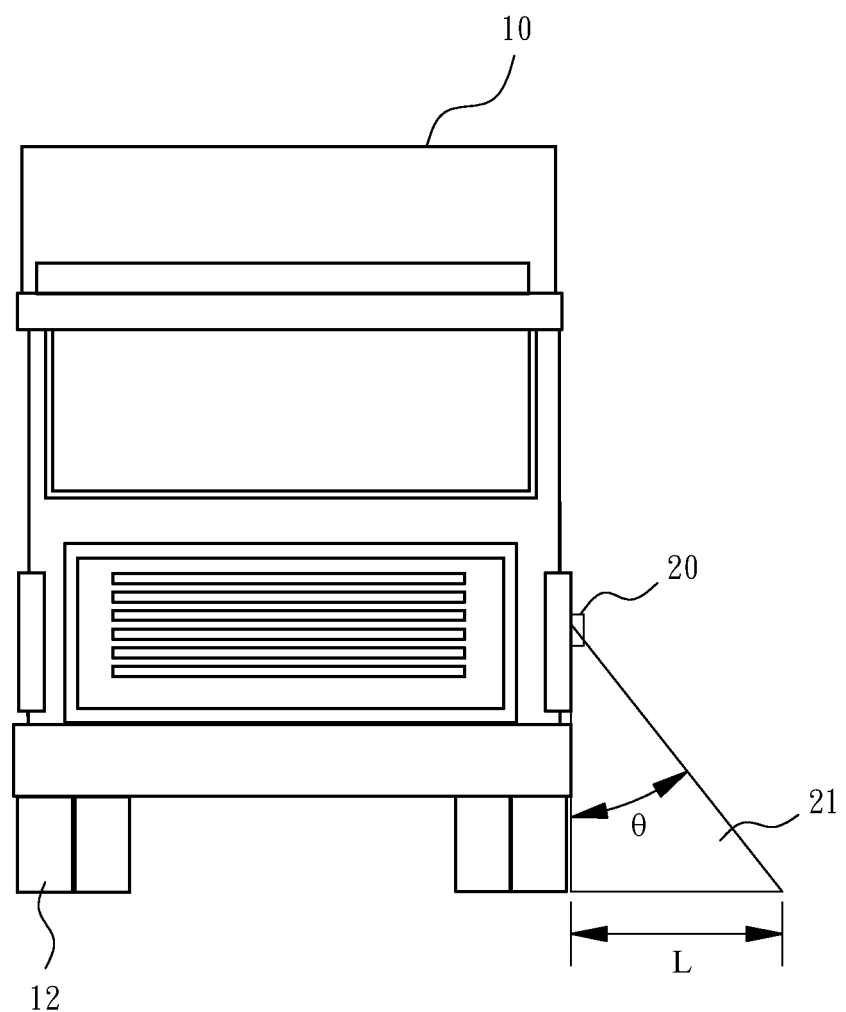
FIG. 9 is a schematic diagram of a front view of the tractor-full trailer according to the third embodiment of the present invention.
Figure 10:
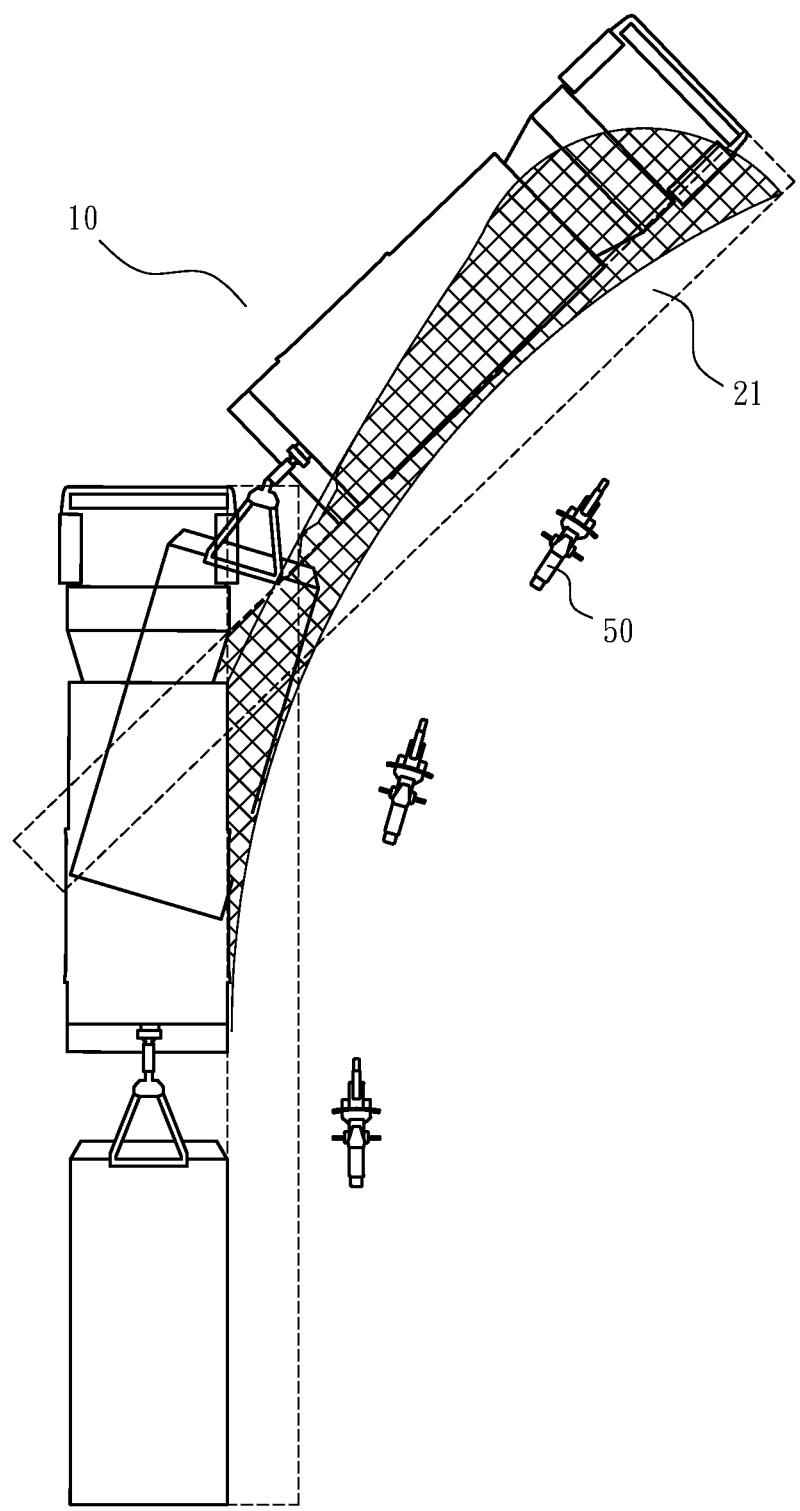
FIG. 10 is a schematic diagram of the tractor-full trailer turning according to the third embodiment of the present invention.

For example, if the car body 10 is a large passenger vehicle (as shown in FIGS. 3 and 4), the range of the difference of radius between inner wheels will be between 3 and 4.5 meters, so when the warning device 20 is set on the car body 10 of the large passenger vehicle at a height of about 1 meter and the illumination angle $\theta$ of the warning light 21 is 52 degrees, the illumination distance L of the warning light 21 can be about 1.65 meters. Further, if the body 10 is a tractor-semi trailer (as shown in FIGS. 6 and 7), the range of the difference of radius between inner wheels will be between 6 and 7.5 meters, so when the warning device 20 is set on the car body 10 of the tractor-full trailer at a height of about 1 meter, and the illumination angle $\theta$ of the warning light 21 is 55 degrees, the illumination distance L of the warning light 21 can be about 1.8 meters. Furthermore, if the car body 10 is a tractor-full trailer (as shown in FIGS. 9 and 10), the range of the difference of radius between inner wheels will be between 2 and 2.5 meters, so when the warning device 20 is set on the car body 10 of the tractor-semi trailer at a height of about 1 meter, and the illumination angle θ of the warning light 21 is 38 degrees, the illumination distance L of the warning light 21 can be about 1 meter. In this way, when the car body 10 turns, the motorcyclist 50 can be warned through the warning light 21 to avoid entering the invisible zone (that is, dangerous zone). According to the illumination angle θ of the above-mentioned embodiments, the range of the illumination angle θ can be between 35 and 80 degrees, but the more specific range can be between 35 and 55 degrees. However, the range of the illumination angle θ can be varied with the difference of the car body 10, so the range of the illumination angle θ mentioned above should not be limited.

By virtue of the technical features disclosed by the present invention, the present invention has significant differences from the first prior technology and the second prior technology, and has the following advantages:

1. The invention uses the display device or the direction light control element as the means for starting or closing the warning device, so that the warning device can be started in advance before turning the car body to provide the warning light.

2. The invention provides a very simple structure, which can effectively achieve the function of early warning pedestrians or motorcyclists.

3. The invention provides a line-type warning light to provide warning in a way of using very little power consumption.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A large vehicle turning safety warning apparatus, comprising:
 a car body, a periphery of the car body being set at least one turning warning zone, and a bottom of the car body being set with plural tires, wherein the at least one turning warning zone is set on a frame of the car body adjacent periphery to the plural tires, which is arranged on the car body in a transverse encircling manner, and extends from one tire to another tire on the same side;
 a plurality of warning devices being set on the turning warning zone, providing warning lights connected with each other in a line to present a line-type light delimiting a boundary of an invisible zone of the car body that a driver cannot see at driving, each warning device providing one warning light with an inclination angle so that an illumination angle is formed between the warning light and the car body; and
 a control module, the control module receiving a control instruction to generate a control signal, the control module being connected with the warning devices to transmit the control signal to the warning devices, wherein the control module starts or closes the warning devices based on the control signal, when the car body turns, according to the difference of the car body, a radius between inner wheels will be different; which leads to a change of the invisible zone of the car body, and the invisible zone is illuminated by the warning lights.

2. The large vehicle turning safety warning apparatus of claim 1, wherein the at least one warning device is synchronized with a direction light of the car body, when the control module starts or closes the direction light, the control module simultaneously generates the control signal to start or close the at least one warning device based on the control signal.

3. The large vehicle turning safety warning apparatus of claim 2, wherein the control module is connected with a direction light control element, when the direction light control element sends a control instruction, the control module generates a direction light signal and the control signal, the control module transmits the direction light signal to the direction light to control the starting or closing of the direction light, and the control module simultaneously transmits the control signal to the at least one warning device to start or close the at least one warning device based on the control signal.

4. The large vehicle turning safety warning apparatus of claim 1, wherein the at least one warning device further executes a warning mode based on the control signal.

5. The large vehicle turning safety warning apparatus of claim 4, wherein the warning mode includes at least one or any combination of scintillation mode, breathing mode, flowing mode, gradient mode and constant brightness mode.

6. The large vehicle turning safety warning apparatus of claim 1, wherein the control module is set on a display device, the display device generates the control instruction for transmission to the control module.

7. The large vehicle turning safety warning apparatus of claim 1, wherein the illumination angle is between 35 and 80 degrees.

8. The large vehicle turning safety warning apparatus of claim 1, wherein the warning light provided by each of the at least one warning device is a line-type light.

9. The large vehicle turning safety warning apparatus of claim 1, wherein each of the at least one turning warning zone is set at a position between 0.3 and 1.4 meters in height.

10. The large vehicle turning safety warning apparatus of claim 1, wherein each of the at least one warning device includes one of the daytime running light, LED light, laser light or halogen lamp.

11. The large vehicle turning safety warning apparatus of claim 1, wherein the car body includes one of the large passenger vehicle, bus, truck, dump truck, tour bus, tractor-full trailer, tractor-semi trailer or goods vehicle.

\* \* \* \* \*